(12) United States Patent
Michishita

(10) Patent No.: US 8,181,548 B2
(45) Date of Patent: May 22, 2012

(54) POWER TRANSMISSION APPARATUS

(75) Inventor: Masaya Michishita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 402 days.

(21) Appl. No.: 12/461,643

(22) Filed: Aug. 19, 2009

(65) Prior Publication Data

US 2010/0050800 A1    Mar. 4, 2010

(30) Foreign Application Priority Data

Aug. 29, 2008   (JP) ................. 2008-221213

(51) Int. Cl.
*H02K 7/116* (2006.01)
(52) U.S. Cl. .................................. 74/421 A
(58) Field of Classification Search ............. 74/421 A, 74/412 R, 413; 184/11.1
See application file for complete search history.

(56) References Cited

U.S. PATENT DOCUMENTS

| | | | | | |
|---|---|---|---|---|---|
| 4,630,711 | A | * | 12/1986 | Levrai et al. | 184/6.12 |
| 4,721,184 | A | * | 1/1988 | Sowards | 184/6.12 |
| 5,832,789 | A | * | 11/1998 | Kinto et al. | 74/606 R |
| 6,864,607 | B2 | * | 3/2005 | Hashimoto | 310/75 R |
| 2004/0154846 | A1 | | 8/2004 | Kira | |
| 2005/0081666 | A1 | * | 4/2005 | Langenberg et al. | 74/421 A |
| 2008/0128208 | A1 | | 6/2008 | Ideshio et al. | |

FOREIGN PATENT DOCUMENTS

| | | |
|---|---|---|
| EP | 0 811 521 A1 | 12/1997 |
| JP | A-9-226394 | 9/1997 |
| JP | A-2003-312282 | 11/2003 |
| JP | A-2005-201316 | 7/2005 |
| JP | A-2007-057093 | 3/2007 |
| JP | A-2008-035661 | 2/2008 |
| JP | A-2008-039079 | 2/2008 |
| JP | A-2008-089016 | 4/2008 |

OTHER PUBLICATIONS

Extended European Search Report issued in European Application No. 09168737.6 dated Aug. 8, 2011.
Japanese Office Action dated Aug. 27, 2010 in Japanese Patent Application No. 200S-221213 (with translation).

* cited by examiner

*Primary Examiner* — Vicky Johnson
(74) *Attorney, Agent, or Firm* — Oliff & Berridge, PLC

(57) ABSTRACT

A power transmission apparatus includes a rotating electric device including a rotor and a stator; a speed reducer; and a case. The speed reducer includes a first drive gear provided on a first shaft connected to the rotating electric device; a first driven gear that engages with the first drive gear, and that is provided on a second shaft that is parallel to the first shaft; a second drive gear provided on the second shaft; and a second driven gear that engages with the second drive gear, and that rotates coaxially with the first shaft. The lower end of the stator, the lower end of the second driven gear, the lower end of the first driven gear, and the lower end of the rotor are disposed in a stated order in a direction from a lower position to an upper position, in the case.

8 Claims, 7 Drawing Sheets

POWER TRANSMISSION APPARATUS

INCORPORATION BY REFERENCE

The disclosure of Japanese Patent Application No. 2008-221213 filed on Aug. 29, 2008 including the specification, drawings and abstract is incorporated herein by reference in its entirety.

BACKGROUND OF THE INVENTION

1. Field of the Invention

The invention relates to a power transmission apparatus. More specifically, the invention relates to a power transmission apparatus provided in a vehicle.

2. Description of the Related Art

For example, Japanese Patent Application Publication No. 2003-312282 (JP-A-2003-312282) describes a power transmission apparatus.

The above publication No. 2003-312282 describes a drive apparatus in which power generated by a motor is input to a differential portion via a reduction gear. In the drive apparatus, an output from the differential portion passes through a hollow shaft of the motor, and an output shaft of the differential portion is provided coaxially with the shaft of the motor.

In the technology, elements in the power transmission apparatus are not sufficiently cooled, and are not sufficiently lubricated.

SUMMARY OF THE INVENTION

The invention provides a power transmission apparatus in which elements are sufficiently cooled and sufficiently lubricated.

An aspect of the invention relates to a power transmission apparatus. The power transmission apparatus includes a rotating electric device that includes a rotor and a stator; a speed reducer that reduces a speed of rotation output from the rotating electric device, and that is lubricated by oil; and a case in which the rotating electric device and the speed reducer are housed. The speed reducer includes a first drive gear provided on a first shaft connected to the rotating electric device; a first driven gear that engages with the first drive gear, and that is provided on a second shaft that is parallel to the first shaft; a second drive gear provided on the second shaft; and a second driven gear that engages with the second drive gear, and that rotates coaxially with the first shaft so that a rotational speed of the second driven gear is lower than a rotational speed of the first shaft. A lower end of the stator is disposed at a position lower than a lower end of the second driven gear and a lower end of the first driven gear, in the case.

In the above-described aspect, a lower end of the rotor may be disposed at a position higher than the lower end of the second driven gear and the lower end of the first driven gear, in the case.

In the above-described aspect, the lower end of the stator, the lower end of the second driven gear, the lower end of the first driven gear, and the lower end of the rotor may be disposed in a stated order in a direction from a lower position to an upper position, in the case.

In the power transmission apparatus with the above-described configuration, the lower end of the stator is disposed at a low position. Therefore, the lower end of the stator is likely to be cooled. On the other hand, the lower end of the rotor is disposed at a high position. Therefore, the oil does not interfere with the rotation of the rotor at high rotational speed.

Also, the lower end of the second driven gear is disposed at a position lower than the lower end of the first driven gear. Therefore, the second driven gear, whose rotational speed is low, contacts a large amount of the oil. Thus, it is possible to reduce contact between the oil and the first driven gear whose rotational speed is high. Accordingly, it is possible to reduce the rotational resistance applied to the first driven gear.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
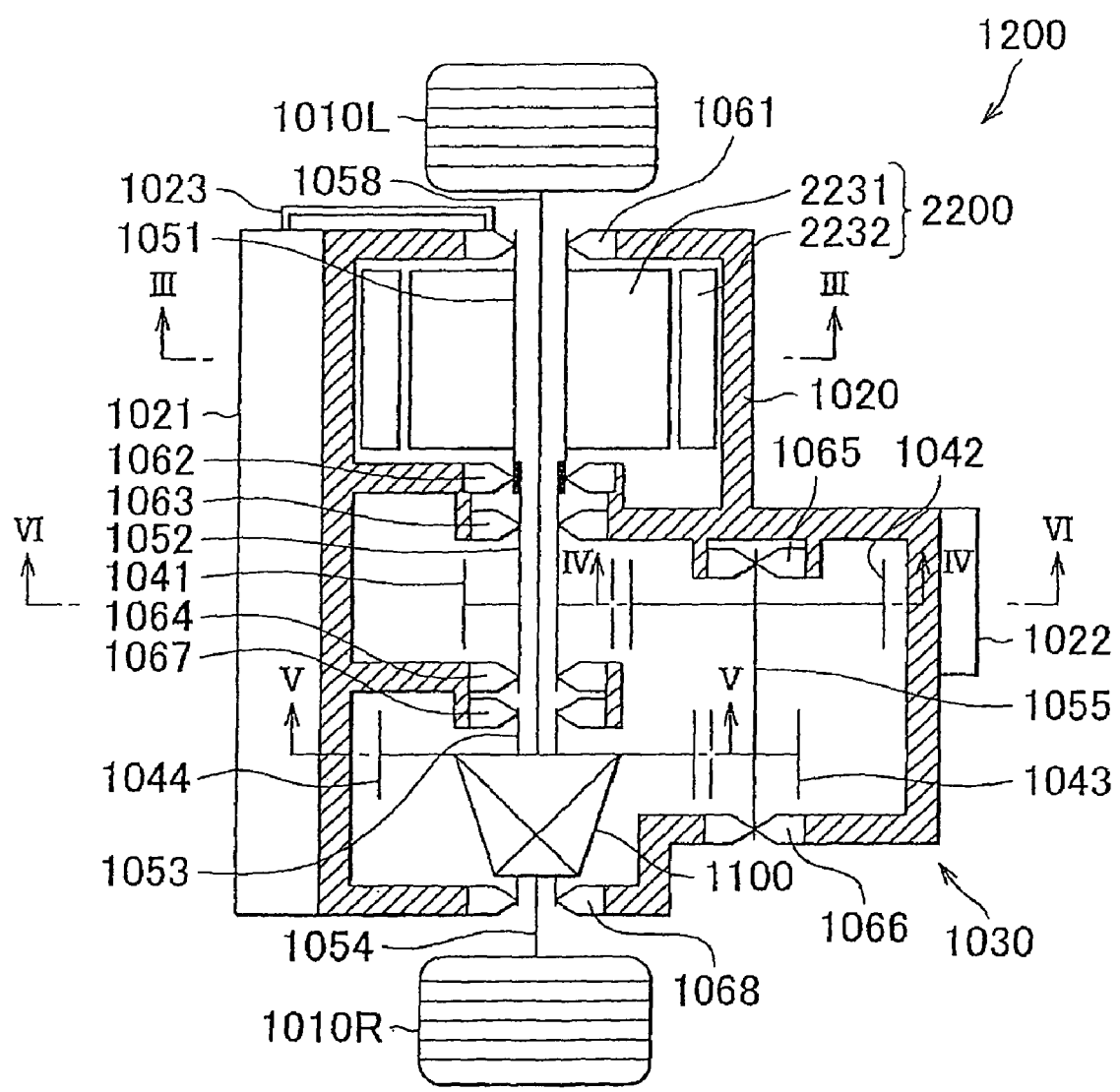
FIG. 1 is a sectional view showing a power transmission apparatus according to an embodiment of the invention.

Hereinafter, an embodiment of the invention will be described with reference to the drawings. In the embodiment described below, the same or corresponding portions are denoted by the same reference numerals, and the description thereof will not be repeated.

FIG. 1 is a sectional view showing a power transmission apparatus according to the embodiment of the invention. As shown in FIG. 1, a power transmission apparatus 1200 includes a case 1020. Elements that transmit power are housed in the case 1020.

A rotating electric device 2200 is positioned at a portion of the case 1020. The rotating electric device 2200 includes a cylindrical stator 2232, and a rotor 2231 disposed in the stator 2232 in a manner such that the rotor 2231 faces the stator 2232. A gap is formed between the stator 2232 and the rotor 2231. The rotor 2231 rotates together with an output shaft 1051.

The rotor 2231 is fixed to the outer peripheral surface of the output shaft 1051. A first shaft 1052 is connected to the output shaft 1051, and the first shaft 1052 rotates together with the output shaft 1051. The first shaft 1052 is rotatably held by bearings 1063 and 1064 in the case 1020. The first shaft 1052 is hollow.

A first drive gear 1041 is fitted to the first shaft 1052. A first driven gear 1042 engages with the first drive gear 1041. The outer diameter of the first driven gear 1042 is larger than the outer diameter of the first drive gear 1041. The first driven gear 1042 is fitted to a second shaft 1055. The rotational speed of the first driven gear 1042 is lower than the rotational speed of the first drive gear 1041. The second shaft 1055 is rotatably held by bearings 1065 and 1066 in the case 1020.

A second drive gear 1043 is fitted to the second shaft 1055. The second drive gear 1043 rotates together with the second shaft 1055 and the first driven gear 1042. The outer diameter of the second drive gear 1043 is smaller than the outer diameter of the first driven gear 1042.

A second driven gear 1044 engages with the second drive gear 1043. The outer diameter of the second driven gear 1044, which functions as a final driven gear, is larger than the outer diameter of the second drive gear 1043, which functions as a final drive gear. The outer diameter of the second driven gear 1044 is smaller than the outer diameter of the stator 2232. The second driven gear 1044 is fitted to a third shaft 1053. The third shaft 1053 is rotatably held by bearings 1067 and 1068 in the case 1020. The third shaft 1053 is hollow.

A differential device 1100 is fitted to the second driven gear 1044. The differential device 1100 distributes rotational force, which is input to the differential device 1100 from the second driven gear 1044, to axle shafts 1054 and 1058. The rotational speeds of the axle shafts 1054 and 1058 are changed. The axle shaft 1054 is connected to a wheel 1010R, and the axle shaft 1058 is connected to a wheel 1010L.

Reservoir tanks 1021 and 1022 are fitted to the case 1020. Oil, which is scooped up by the second driven gear 1044, is stored in the reservoir tank 1021. The oil stored in the reservoir tank 1021 is returned into the case 1020 through an oil passage 1023 and a bearing 1061.

The reservoir tank 1022 is connected to the reservoir tank 1021. The oil, which is scooped up by the first driven gear 1042, is stored in the reservoir tank 1022. The oil stored in the reservoir tank 1022 is returned into the case 1020 through the reservoir tank 1021 and the oil passage 1023.

A speed reducer 1030 includes the first drive gear 1041, the first driven gear 1042, the second drive gear 1043, and the second driven gear 1044. The rotational speed of the second driven gear 1044 is lower than the rotational speed of the first drive gear 1041.

Figure 2:
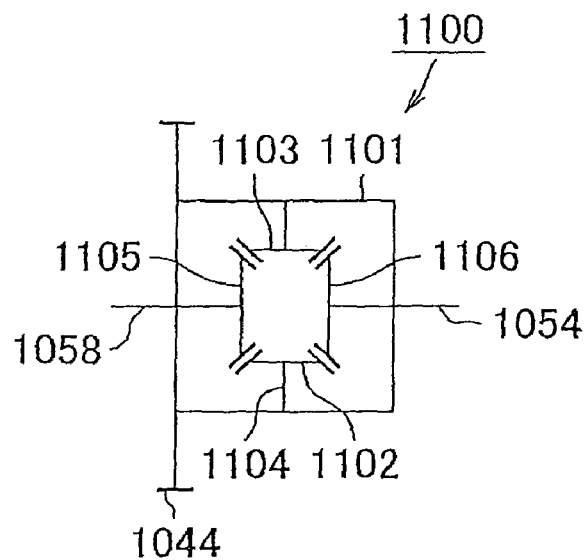
FIG. 2 is a diagram schematically showing a configuration of a differential device.

FIG. 2 schematically shows a configuration of the differential device. When a vehicle travels, the rotational speed of the right wheel may differ from the rotational speed of the left wheel, depending on the turning movement of the vehicle or the condition of a road surface. Therefore, the differential device is required to automatically make the rotational speed of the right wheel different from the rotational speed of the left wheel. For example, when the vehicle turns, a distance that the outer wheel moves is longer than a distance that the inner wheel moves in the case where a track on which the outer wheel moves is compared with a track on which the inner wheel moves. Therefore, the outer wheel needs to rotate at a higher speed than the inner wheel, and the outer wheel needs to rotate more times than the inner wheel.

Also, in the case where the vehicle travels on a rough road, if both of the wheels travel on the same rough road surface, the rotational speeds of the both wheels are the same. However, if one wheel travels on a flat road surface, and the other wheel travels on a rough road surface, the rotational speed of the wheel that travels on the rough road surface is higher than the rotational speed of the wheel that travels on the flat road surface. Also, the rotational speed of the right wheel may differ from the rotational speed of the left wheel depending on the state of wear of the wheels, and air pressures of the wheels.

In this situation, if right and left tires rotate at the same rotational speed, one of the tires rotates while slipping. This significantly accelerates the wearing of the wheel, and adversely affects traveling performance. Therefore, the differential device, which transmits power, and makes the rotational speed of the right wheel different from the rotational speed of the left wheel, is required.

The differential device 1100 includes the second driven gear 1044 that functions as a ring gear. A differential case 1101 is fitted to the second driven gear 1044. A pinion shaft 1104 is rotatably held by the differential case 1101. Two or four pinions 1102 are provided in the differential case 1101. The pinions 1102 and 1103 are fitted to the pinion shaft 1104. Each of the pinions 1102 and 1103 rotates about its axis, and revolves in the differential case 1101.

Side gears 1105 and 1106 engage with the pinions 1102 and 1103. The side gears 1105 and 1106 are rotatably held in the differential case 1101. The axle shafts 1054 and 1058 are fitted to the side gears 1106 and 1105, respectively.

When the vehicle travels straight, a rotational resistance applied to the right wheel is equal to a rotational resistance applied to the left wheel. Therefore, the right and left side gears 1106 and 1105 move according to the revolution of the pinions 1102 and 1103. Thus, the side gears 1105 and 1106 and the pinions 1102 and 1103 constitute one block that rotates. In this case, each of the pinions 1102 and 1103 does not rotate about its axis. Therefore, the rotational speed of the second driven gear 1044, the rotational speed of the differential case 1101, the rotational speeds of the side gears 1105 and 1106, and the rotational speeds of the axle shafts 1054 and 1058 are equal to each other.

When the vehicle turns, the inner wheel rolls a shorter distance than a distance that the outer wheel rolls, and the resistance applied to the inner wheel is larger than the resistance applied to the outer wheel. In other words, the outer wheel moves a longer distance than a distance that the inner wheel moves, and the resistance applied to the outer wheel is smaller than the resistance applied to the inner wheel. Therefore, for example, the resistance applied to the side gear 1105 is larger than the resistance applied to the side gear 1106. Accordingly, each of the pinions 1102 and 1103 rotates about its axis, while revolving. As a result, the rotational speed of the side gear 1106 increases. Thus, the rotational force of the differential case 1101 is distributed to the axle shafts 1054 and 1058 unequally.

If one wheel slips or idles, for example, when the vehicle travels on a sloppy road, or when the vehicle suddenly turns, drive power is lost in the above-described differential device 1100. To avoid this situation, a limited slip differential may be provided in the differential device 1100.

Figure 3:
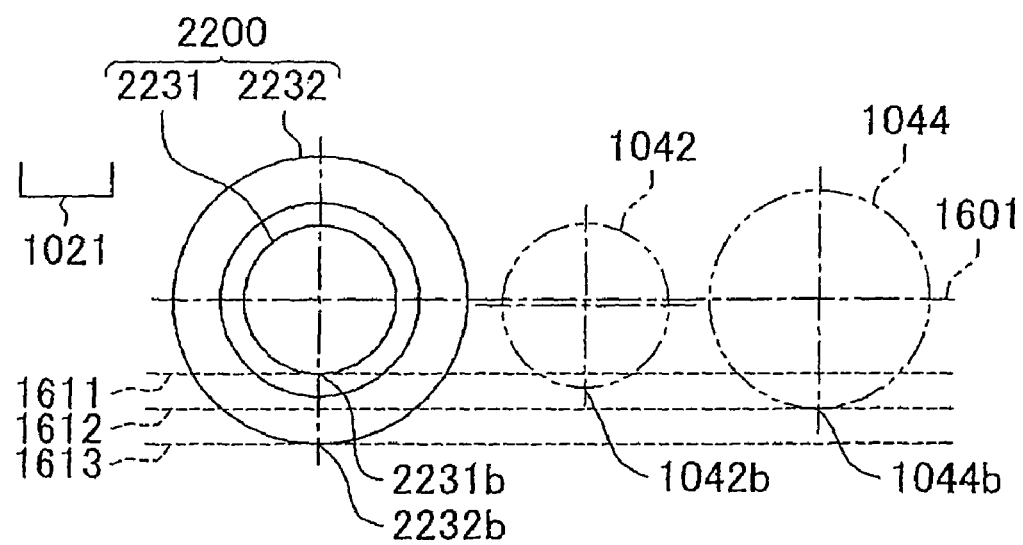
FIG. 3 is a sectional view taken along the line III-III in FIG. 1.

FIG. 3 is sectional view taken along the line III-III in FIG. 1. As shown in FIG. 3, a dotted line 1613 indicates an oil surface that contacts a lower end portion 2232b of the stator 2232. A dotted line 1612 indicates an oil surface that contacts a lower end portion 1044b of the second driven gear 1044. A dotted line 1611 indicates an oil surface that contacts a lower end portion 2231b of the rotor 2231. The rotor 2231, the stator 2232, and the second driven gear 1044 have a common center line 1601. This is because the rotor 2231, the stator 2232, and the second driven gear 1044 are coaxially positioned. In the cross section shown in FIG. 3, only the rotating electric device 2200 and the reservoir tank 1021 can be seen, and the first driven gear 1042 and the second driven gear 1044 cannot be seen. Therefore, in FIG. 3, the first driven gear 1042 and the second driven gear 1044 are shown by hypothetical lines.

Figure 4:
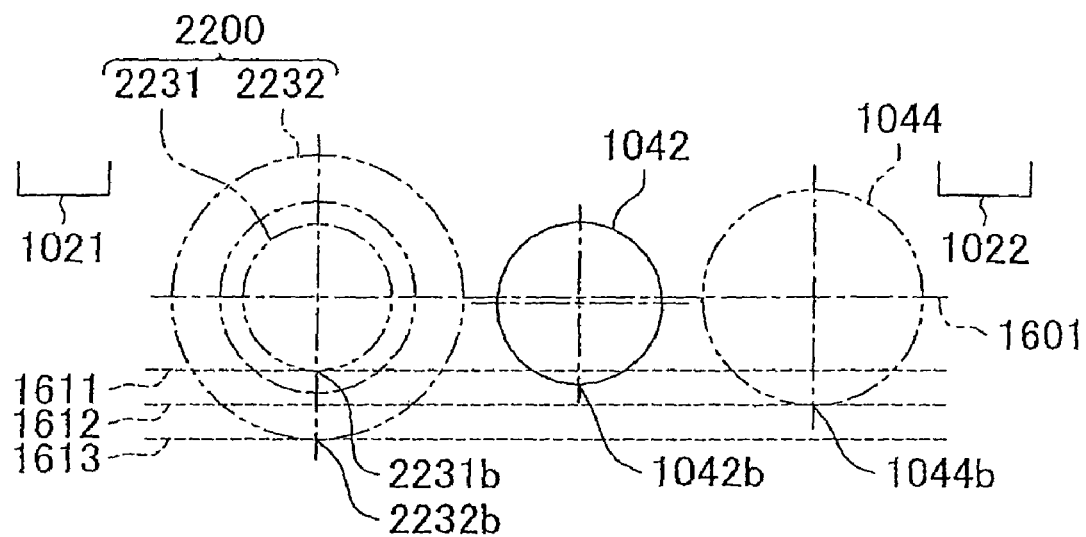
FIG. 4 is a sectional view taken along the line IV-IV in FIG. 1.

FIG. 4 is a sectional view taken along the line IV-IV in FIG. 1. As shown in FIG. 4, a lower end portion 1042b of the first driven gear 1042 is positioned between the dotted line 1611 and a dotted line 1612. The reservoir tank 1021 is provided on one side of the first driven gear 1042, and the reservoir tank 1022 is provided on the other side of the first driven gear 1042.

Figure 5:
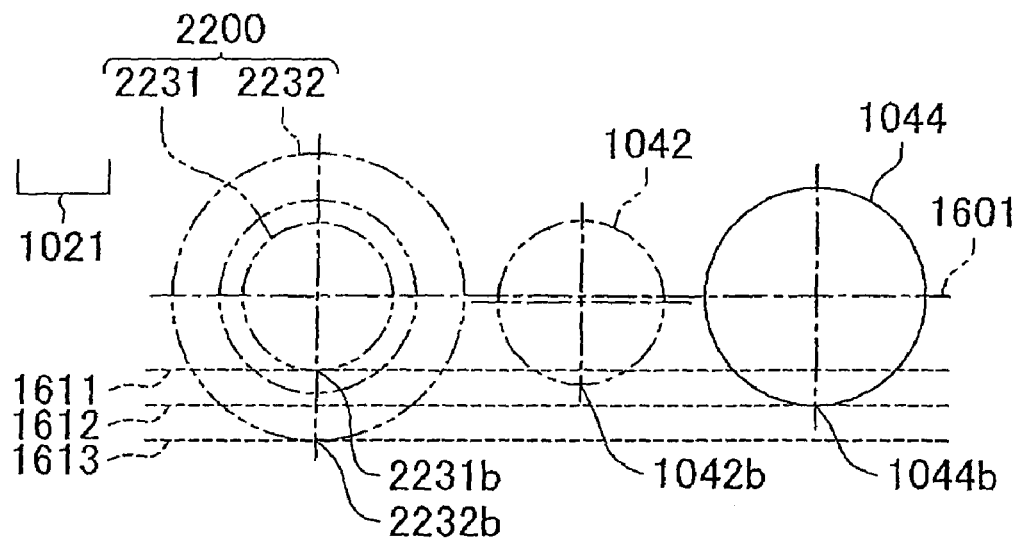
FIG. 5 is a sectional view taken along the line V-V in FIG. 1.

FIG. 5 is a sectional view taken along the line V-V in FIG. 1. As shown in FIG. 5, the second driven gear 1044 is distant from the reservoir tank 1021.

Figure 6:
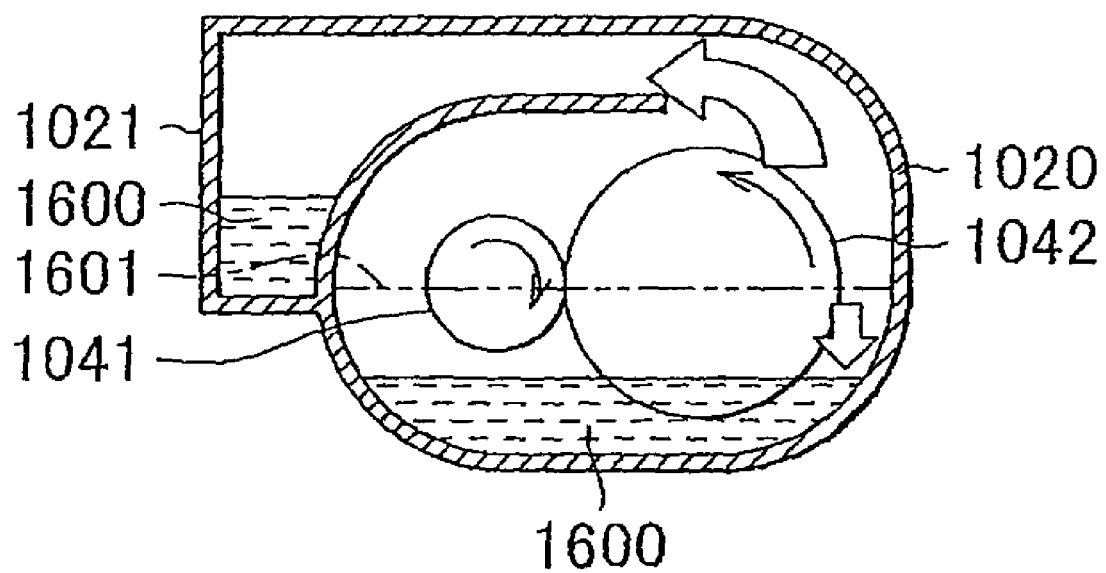
FIG. 6 is a sectional view taken along the line VI-VI in FIG. 1.

FIG. 6 is a sectional view taken along the line VI-VI in FIG. 1. As shown in FIG. 6, the first drive gear 1041 engages with the first driven gear 1042. Each of the first drive gear 1041 and the first driven gear 1042 rotates in a direction shown by an arrow. A lower portion of the first driven gear 1042 is immersed in oil 1600. Therefore, the first driven gear 1042 scoops the oil up. In this example, the first driven gear 1042 scoops the oil 1600 up to the reservoir tank 1021. The first driven gear 1042 may scoop the oil 1600 up to the other reservoir tank.

Figure 7:
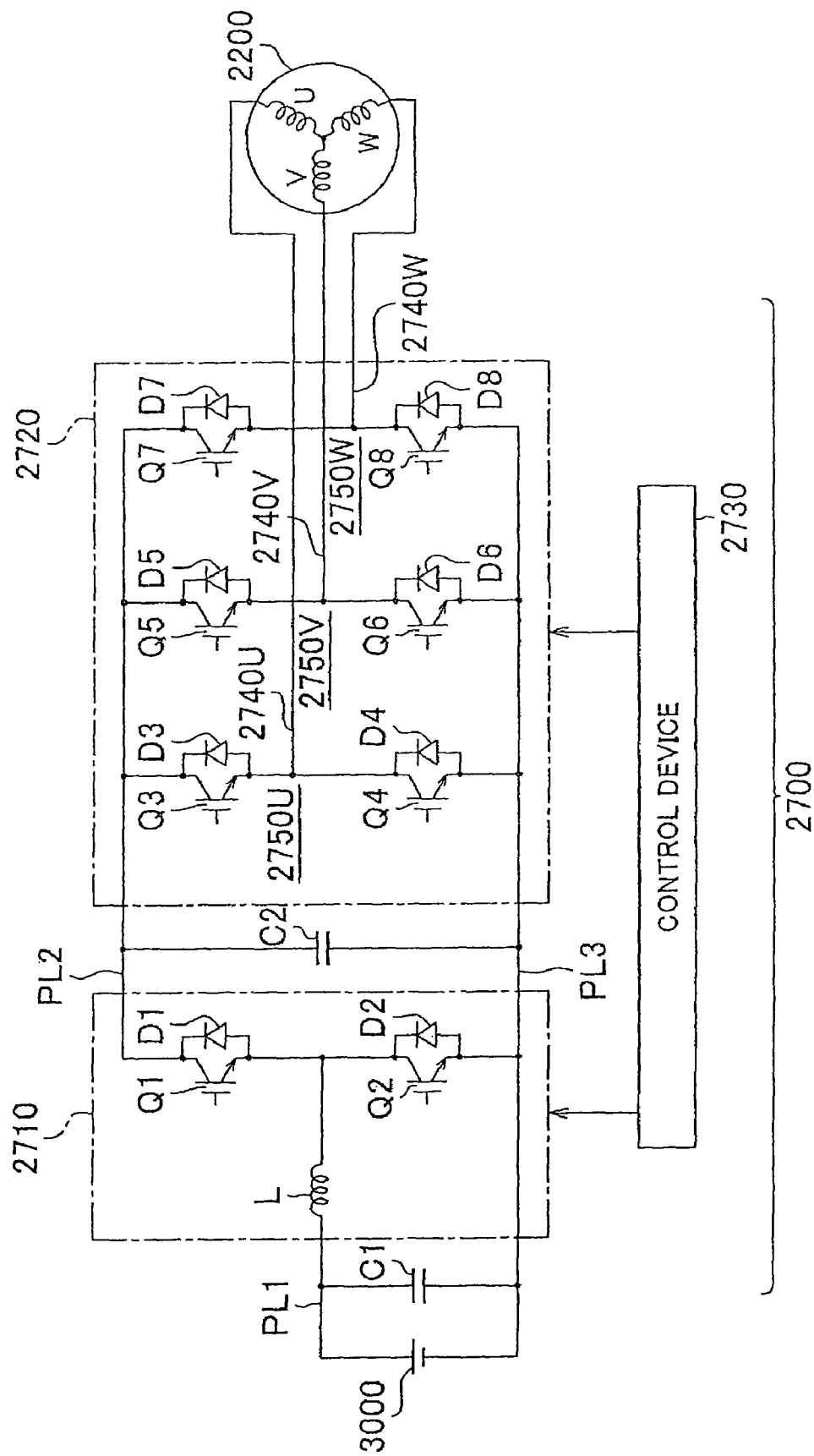
FIG. 7 is a diagram showing an electric circuit used to drive a rotating electric device provided in a vehicle according to the embodiment of the invention.

FIG. 7 shows an electric circuit used to drive the rotating electric device provided in the vehicle according to the embodiment of the invention. As shown in FIG. 7, a Power Control Unit (PCU) 2700 includes a converter 2710, an inverter 2720, a control device 2730, capacitors C1 and C2, power supply lines PL1 to PL3, and output lines 2740U, 2740V, and 2740W. The converter 2710 is connected between a battery 3000 and the inverter 2720. The inverter 2720 is connected to the rotating electric device 2200 via the output lines 2740U, 2740V, and 2740W.

The battery 3000, which is connected to the converter 2710, is a secondary battery, such as a nickel hydride battery and a lithium ion battery. The battery 3000 supplies generated DC voltage to the converter 2710. Also, the battery 3000 is charged with DC voltage supplied from the converter 2710.

The converter 2710 includes power transistors Q1 and Q2, diodes D1 and D2, and a reactor L. The power transistors Q1 and Q2 are connected to each other in series between the power supply lines PL2 and PL3. A control signal transmitted from the control device 2730 is received at a base of each of the power transistors Q1 and Q2. Each of the diodes D1 and D2 is connected between a collector and an emitter of the corresponding one of the power transistors Q1 and Q2 so that electric current flows from the emitter to the collector. One end of the reactor L is connected to the power supply line PL1 that is connected to a positive electrode of the battery 3000. The other end of the reactor L is connected to a connection point at which the power transistors Q1 and Q2 are connected to each other.

The converter 2710 increases the DC voltage that is received from the battery 3000 using the reactor L. Then, the converter 2710 supplies the increased voltage to the power supply line PL2. The converter 2710 decreases the DC voltage received from the inverter 2720, and charges the battery 3000.

The inverter 2720 includes a U-phase arm 2750U, a V-phase arm 2750V, and a W-phase arm 2750W. The phase arms are connected in parallel between the power supply lines PL2 and PL3. The U-phase arm 2750U includes power transistors Q3 and Q4 that are connected to each other in series. The V-phase arm 2750V includes power transistors Q5 and Q6 that are connected to each other in series. The W-phase arm 2750 W includes power transistors Q7 and Q8 that are connected to each other in series. Each of the diodes D3 to D8 is connected between a collector and an emitter of the corresponding one of the power transistors Q3 to Q8 so that electric current flows from the emitter to the collector. A connection point, at which each power transistor is connected to the corresponding phase arm, is connected to a portion of the corresponding phase coil of the rotating electric device 2200, which is opposite to a neutral point, via a corresponding one of the output lines 2740U, 2740V, and 2740W. The rotating electric device 2200 is a motor-generator.

The inverter 2720 converts the DC voltage, which is received from the power supply line PL2, to AC voltage, and outputs the AC voltage to the rotating electric device 2200, based on the control signal transmitted from the control device 2730. Also, the inverter 2720 rectifies the AC voltage generated by the rotating electric device 2200 to the DC voltage, and supplies the DC voltage to the power supply line PL2.

The capacitor C1 is connected between the power supply lines PL1 and PL3, and the capacitor C1 smoothes the voltage level of the power supply line PL1. The capacitor C2 is connected between the power supply lines PL2 and PL3, and the capacitor C2 smoothes the voltage level of the power supply line PL2.

The control device 2730 calculates the voltages of the phase coils of the rotating electric device 2200 based on a motor torque command value, values of phase currents of the rotating electric device 2200, and the input voltage of the inverter 2720. Then, the control device 2730 generates Pulse Width Modulation (PWM) signals that turn on and off the power transistors Q3 to Q8, and outputs the PWM signals to the inverter 2720, based on the calculated voltages of the phase coils.

Further, the control device 2730 calculates duty ratios of the power transistors Q1 and Q2 to optimize the input voltage of the inverter 2720 based on the motor torque command value and a motor rotational speed. Then, the control device 2730 generates PWM signals that turn on/off the power transistors Q1 and Q2 based on the calculated duty ratios of the power transistors Q1 and Q2, and outputs the PWM signals to the converter 2710.

Further, the control device 2730 controls the turning on/off of the power transistors Q1 to Q8 in the converter 2710 and the inverter 2720, to convert the AC power generated by the rotating electric device 2200 to the DC power, and to charge the battery 3000 with the DC power.

In the PCU 2700, the converter 2710 increases the DC voltage received from the battery 3000, and supplies the increased DC voltage to the power supply line PL2, based on the control signal transmitted from the control device 2730. The inverter 2720 receives the DC voltage, which is smoothed by the capacitor C2, from the power supply line PL2, and converts the received DC voltage to the AC voltage. Then, the inverter 2720 outputs the AC voltage to the rotating electric device 2200.

The inverter 2720 converts the AC voltage, which is generated by the regenerative operation of the rotating electric device 2200, to the DC voltage, and outputs the DC voltage to the power supply line PL2. The converter 2710 receives the DC voltage, which is smoothed by the capacitor C2, from the power supply line PL2. Then, the converter 2710 decreases the received DC voltage, and charges the battery 3000 with the DC voltage.

Figure 8:
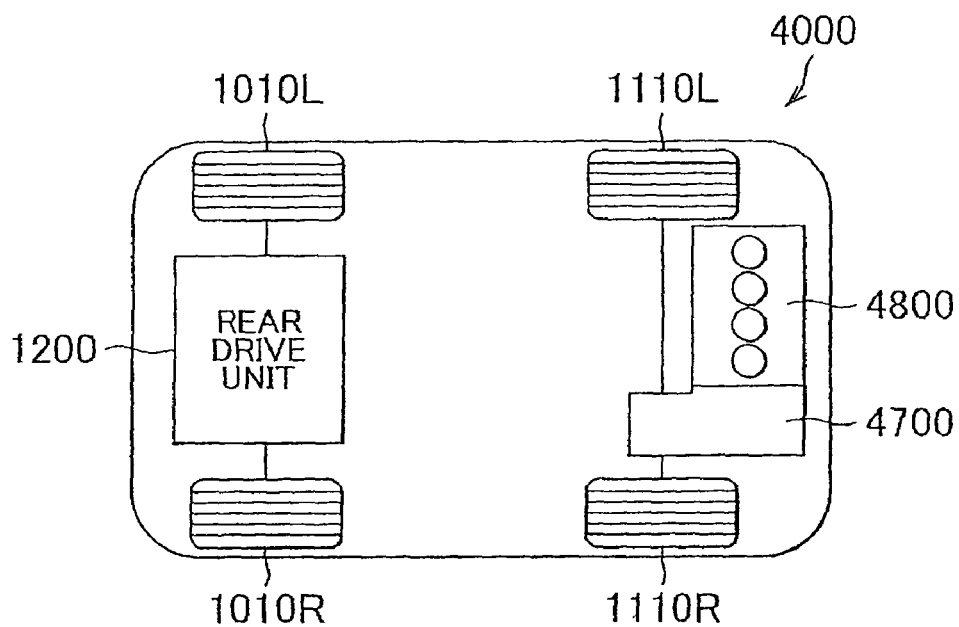
FIG. 8 is a schematic plane view showing a four-wheel drive vehicle in which the power transmission apparatus according to the embodiment of the invention is provided near rear wheels.

FIG. 8 is a schematic plane view showing a four-wheel drive vehicle in which the power transmission apparatus according to the embodiment of the invention is provided near rear wheels. As shown in FIG. 8, the power transmission apparatus 1200, which is a rear drive unit, is provided between the right and left wheels 1010R and 1010L. An engine 4800 and a transaxle 4700 are provided in a front portion of the vehicle. Thus, a wheel 1110R and a wheel 1110L are drive using the engine 4800 and the transaxle 4700.

In the example, the power transmission apparatus 1200 according to the embodiment of the invention is used as a rear drive unit. However, the invention is not limited to this configuration. The power transmission apparatus 1200 according to the embodiment of the invention may be used as a front drive unit. Also, the power transmission apparatus 1200 according to the embodiment of the invention may be provided in a center portion of a four-wheel drive vehicle, and the differential device 1100 shown in FIG. 1 may be used as a center differential.

Figure 9:
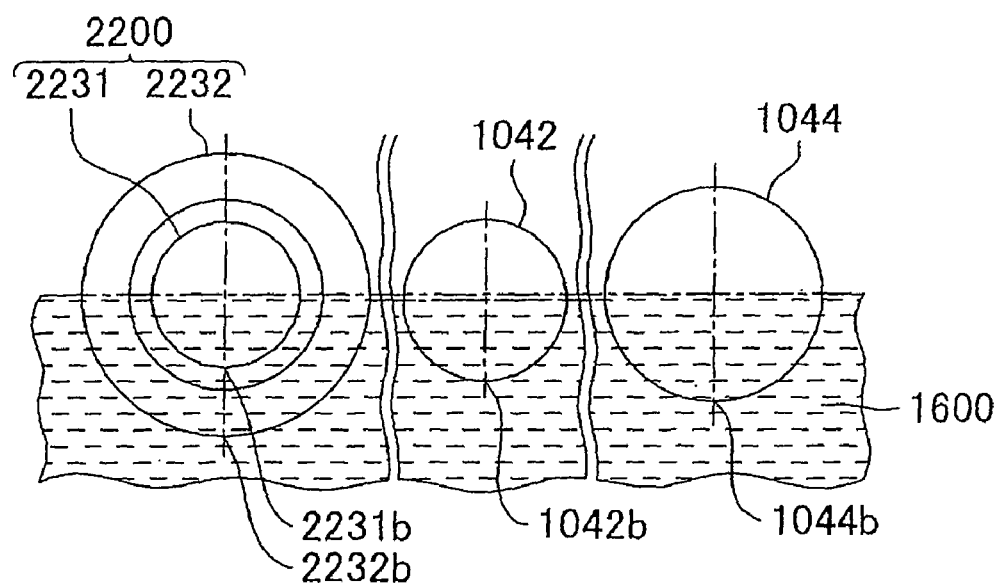
FIG. 9 is a schematic diagram showing the rotating electric device and a speed reducer, which are in a stopped state, in the embodiment of the invention.
Figure 10:
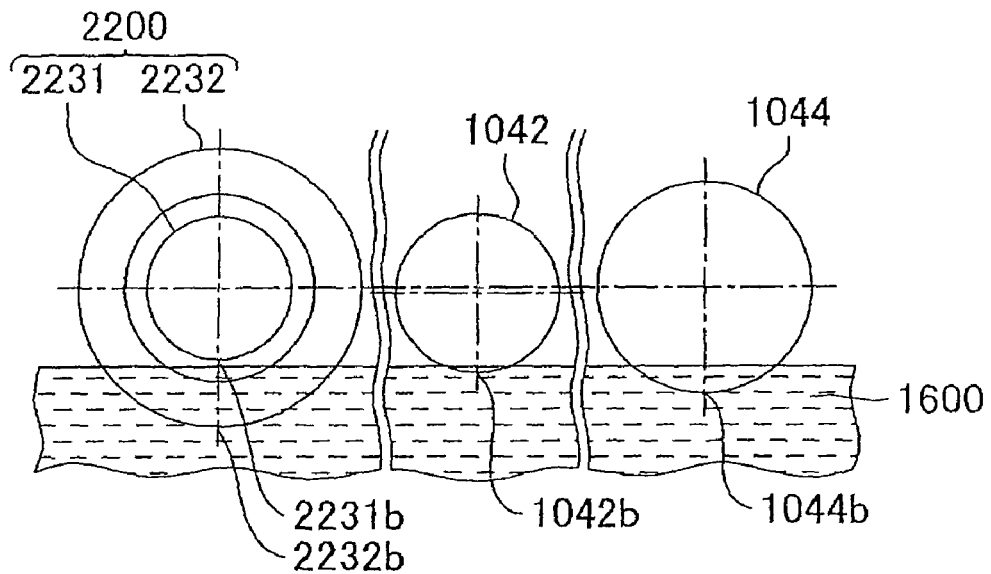
FIG. 10 is a schematic diagram showing the rotating electric device and the speed reducer, which operate at low-to-middle rotational speed, in the embodiment of the invention.
Figure 11:
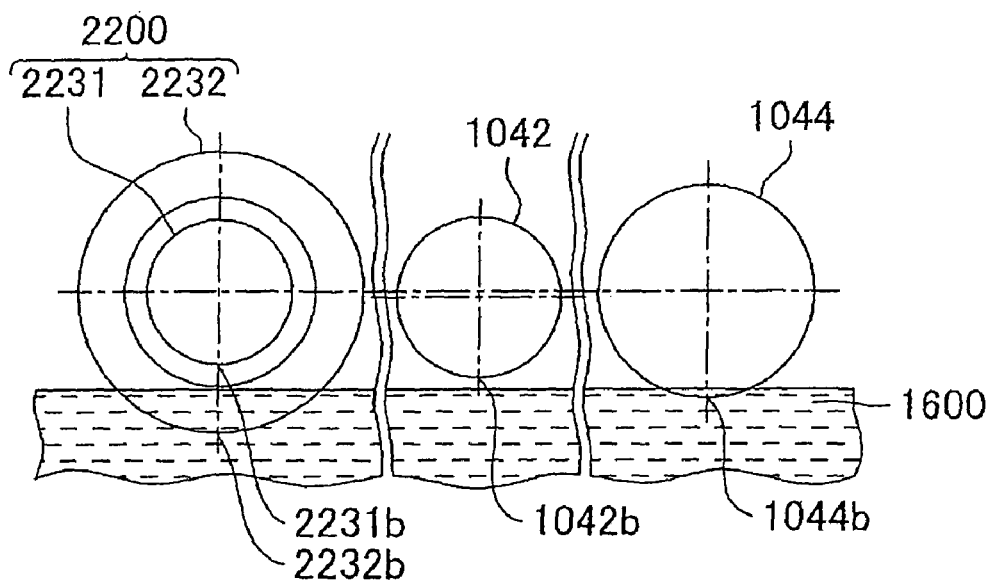
FIG. 11 is a schematic diagram showing the rotating electric device and the speed reducer, which operate at middle-to-high rotational speed, in the embodiment of the invention.

Each of FIG. 9 to FIG. 11 shows a relation between oil and a traveling state of the vehicle that includes the power transmission apparatus according to the embodiment of the invention.

FIG. 9 is a schematic diagram showing the rotating electric device and the speed reducer, which are in a stopped state. During a period from when the rotating electric device and the speed reducer are in the stopped state, to when an engine rotational speed is low, the first driven gear 1042, which functions as a counter driven gear, the second driven gear 1044, which functions as the final driven gear, the rotor 2231, and the stator 2232 are all immersed in the oil 1600. If the first driven gear 1042 and the second driven gear 1044 scoop the oil 1600 up when the rotating electric device and the speed reducer are in the state shown in FIG. 9, a large amount of the oil 1600 moves into the reservoir tanks 1021 and 1022. This reduces contact between the rotor 2231, which rotates at the highest rotational speed, and the oil surface. Thus, it is possible to quickly decrease the rotational resistance applied to the rotor 2231.

FIG. 10 is a schematic diagram showing the rotating electric device and the speed reducer, which operate at low-to-middle rotational speed. As shown in FIG. 10, if the rotational speed increases, and the first driven gear 1042 and the second driven gear 1044 continue to scoop the oil up, the lower end portion 2231b of the rotor 2231 has no contact with the oil 1600. Thus, it is possible to decrease the rotational resistance applied to the rotor 2231.

If the rotational speed further increases after the rotating electric device and the speed reducer are placed in the state shown in FIG. 10, both of the first driven gear 1042 and the second driven gear 1044 scoop the oil up.

FIG. 11 is a schematic diagram showing the rotating electric device and the speed reducer, which operate at middle-to-high rotational speed. As shown in FIG. 11, if the rotational speed further increases, the oil 1600 is scooped up, and the lower end portion 1042b of the first driven gear 1042 has no contact with the oil 1600. Even when the rotating electric device and the speed reducer are in the state shown in FIG. 11, the lower end portion 1044b of the second driven gear 1044 and the lower end portion 2232b of the stator 2232 have contact with the oil 1600. The lower end portion 2232b of the stator 2232 always contacts the oil 1600, regardless of the vehicle speed. Therefore, it is expected that the lower end portion 2232b of the stator 2232 is cooled by the oil 1600.

Even when the rotating electric device and the speed reducer are not in the state shown in FIG. 11, in which the lower end portion 1042b of the first driven gear 1042 has no contact with the oil 1600, if the oil 1600 is scooped up after the rotating electric device and the speed reducer are placed in the state shown in FIG. 10, the oil surface is lowered, and accordingly, the contact between the first and second driven gears 1042 and 1044 and the oil 1600 is reduced as compared to when the rotating electric device and the speed reducer are in the state shown in FIG. 10. Thus, efficiency is improved.

The power transmission apparatus 1200 according to the embodiment of the invention includes the rotating electric device 2200; the speed reducer 1030 that reduces the speed of rotation output from the rotating electric device 2200; and the case 1020 in which the rotating electric device 2200 and the speed reducer 1030 are housed. The speed reducer 1030 includes the first drive gear 1041 provided on the first shaft 1052 connected to the rotating electric device 2200; the first driven gear 1042 that engages with the first drive gear 1041, and that is provided on the second shaft 1055 that is parallel to the first shaft 1052; the second drive gear 1043 provided on the second shaft 1055; and the second driven gear 1044 that engages with the second drive gear 1043, and that rotates coaxially with the first shaft 1052 so that the rotational speed of the second driven gear 1044 is lower than the rotational speed of the first shaft 1052. In the case 1020, the lower end portion 2232b of the stator 2232, the lower end portion 1044b of the second driven gear 1044, the lower end portion 1042b of the first driven gear 1042, and the lower end portion 2231b of the rotor 2231 are disposed in the stated order in a direction from a lower position to an upper position. The power transmission apparatus 1200 further includes the reservoir tanks 1021 and 1022 in which the oil 1600, which is scooped up by at least one of the first driven gear 1042 and the second driven gear 1044, is stored. The oil 1600 is returned from the reservoir tanks 1021 and 1022 into the case 1020.

The power transmission apparatus 1200 further includes the differential device 1100 connected to the second driven gear 1044. The differential device 1100 is connected to a pair of axle shafts 1054 and 1058. The first shaft 1052 is hollow, and a portion of the axle shaft 1058 extends through the hollow axle shaft 1058.

The axle shafts 1054 and 1058 are connected to the wheel 1010R and the wheel 1010L, respectively.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:
1. A power transmission apparatus comprising:
a rotating electric device that includes a rotor and a stator;
a speed reducer that reduces a speed of rotation output from the rotating electric device, and that is lubricated by oil; and
a case in which the rotating electric device and the speed reducer are housed;
wherein
the speed reducer includes:
  a first drive gear provided on a first shaft connected to the rotating electric device;
  a first driven gear that engages with the first drive gear, and that is provided on a second shaft that is parallel to the first shaft;
  a second drive gear provided on the second shaft; and
  a second driven gear that engages with the second drive gear, and that rotates coaxially with the first shaft so that a rotational speed of the second driven gear is lower than a rotational speed of the first shaft;
a lower end of the stator is disposed at a position lower than a lower end of the second driven gear and a lower end of the first driven gear, in the case;

a lower end of the rotor is disposed at a position higher than the lower end of the second driven gear and the lower end of the first driven gear, in the case; and the lower end of the stator, the lower end of the second driven gear, the lower end of the first driven gear, and the lower end of the rotor are disposed in a stated order in a direction from a lower position to an upper position, in the case.

2. The power transmission apparatus according to claim 1, further comprising a differential device connected to the second driven gear.

3. The power transmission apparatus according to claim 2, wherein the differential device is connected to a pair of axle shafts, and a portion of the axle shaft extends through the first shaft that is hollow.

4. The power transmission apparatus according to claim 3, wherein the axle shafts are connected to respective wheels.

5. The power transmission apparatus according to claim 1, further comprising a reservoir tank in which the oil, which is scooped up by at least one of the first driven gear and the second driven gear, is stored, wherein the oil stored in the reservoir tank is returned into the case.

6. The power transmission apparatus according to claim 5, wherein the reservoir tank receives the oil scooped up by both of the first driven gear and the second driven gear.

7. The power transmission apparatus according to claim 5, wherein the reservoir tank includes a first reservoir tank and a second reservoir tank; and the oil, which is scooped up by at least one of the first driven gear and the second driven gear, is stored in each of the first reservoir tank and the second reservoir tank.

8. The power transmission apparatus according to claim 7, wherein the second reservoir tank is connected to the first reservoir tank; and the oil stored in the second reservoir tank is returned into the case through the first reservoir tank.

\* \* \* \* \*